United States Patent [19]
Laffey et al.

[11] Patent Number: 5,158,279
[45] Date of Patent: Oct. 27, 1992

[54] MAGNETIC CLUTCH WITH ADJUSTABLE SLIP TORQUE

[75] Inventors: Kathleen M. Laffey; Russell J. Sokac; Michael J. Martin, all of Rochester; Lloyd W. Durfey, Palmyra; Gerald Garavuso, Farmington, all of N.Y.

[73] Assignee: Xerox Corporation, Stamford, Conn.

[21] Appl. No.: 767,455

[22] Filed: Sep. 30, 1991

[51] Int. Cl.$^5$ .............................................. B65H 3/06
[52] U.S. Cl. ................... 271/272; 192/84 PM; 192/110 R; 271/122; 271/116
[58] Field of Search ............... 271/114, 116, 121, 122, 271/272; 192/84 PM, 110 R; 494/29

[56] References Cited

U.S. PATENT DOCUMENTS

| | | | |
|---|---|---|---|
| 1,862,267 | 6/1932 | Honig. | |
| 3,974,884 | 8/1976 | Gidlund | 173/12 |
| 4,239,092 | 12/1980 | Janson | 188/267 |
| 4,469,220 | 9/1944 | Becker | 198/781 |
| 5,050,854 | 9/1991 | Tajima | 271/122 |

FOREIGN PATENT DOCUMENTS

| | | | |
|---|---|---|---|
| 0357012 | 3/1990 | European Pat. Off. | 271/121 |
| 3031647 | 3/1982 | Fed. Rep. of Germany | 464/29 |
| 2381208 | 10/1978 | France | 192/84 PM |
| 0218445 | 9/1988 | Japan | 271/121 |
| 0028433 | 1/1990 | Japan | 271/121 |
| 0038231 | 2/1990 | Japan | 271/121 |

Primary Examiner—H. Grant Skaggs
Assistant Examiner—Carol Lynn Druzbick
Attorney, Agent, or Firm—R. Hutter

[57] ABSTRACT

A magnetic clutch provides an adjustable slip torque. A housing, having an outer surface of a predetermined frictional coefficient, is disposed around a portion of a shaft, and is rotatable relative to the shaft An outer magnetic member is disposed on the inner surface of the housing, and an inner magnetic member is attached to the shaft and disposed within the housing. The slip torque is adjusted by varying the amount of surface area exposure between the inner magnetic member and the outer magnetic member.

14 Claims, 3 Drawing Sheets

MAGNETIC CLUTCH WITH ADJUSTABLE SLIP TORQUE

FIELD OF THE INVENTION

The present invention relates to a magnetic clutch with an adjustable slip torque, as would be used, for example, in a sheet-feeding apparatus.

BACKGROUND OF THE INVENTION

Magnetic slip clutches employ an arrangement of magnetic members to provide a desired slip torque between input and output members. Magnetic slip clutches are more reliable than mechanical slip clutches, because there is less direct contact among the parts of a magnetic clutch as compared to a mechanical clutch, and thus the slip torque of a magnetic clutch is less likely to vary over time.

The "slip torque" of a magnetic slip clutch can be generally defined as the amount of torque that must be provided to one part of the clutch to cause it to rotate relative to another part of the clutch. If the clutch is incorporated in a cylindrical roller, for example, the outer surface of the roller rotates relative to a fixed shaft. However, the outer surface will not rotate relative to the shaft unless there is provided to the roller a torque greater than the slip torque of the clutch. If this torque is insufficient, the outer surface will remain rigid relative to the shaft and the roller will not rotate relative to the shaft. The slip torque is a function of the strength and relative positions of the magnetic members used in the clutch. Because there may be variations in the strength of magnetic members of a particular type, and because of manufacturing variations which cause differences in spacing among the magnetic members in each clutch, the slip torque among individual magnetic clutches of the same design may vary significantly.

Magnetic clutches have many applications in copiers and printers, but they are usually used in sheet feeding situations. "Sheets," as used in the specification and claims herein, may be either original documents to be copied, or copy sheets onto which images are subsequently copied or printed. The key problems of sheet feeding, as is well known in the art, include multifeeding (the passage of more than one sheet through a nip in the apparatus where only one sheet at a time is intended), crumpling, and jamming. Any number of prior art arrangements for obviating these common problems of sheet feeding devices rely on a predetermined relationship among such factors as the coefficients of friction between two sheets or between one sheet and a surface of the apparatus, and the slip torques of various rollers in the system. An unsuitable slip torque in any part of the system could defeat the purpose of such anti-misfeeding devices.

One solution to the problem of insuring a proper slip torque for a magnetic clutch in a sheet feeding or other system is to provide a magnetic clutch with an adjustable slip torque. In this way, a large number of clutches may be manufactured relatively inexpensively, and the "fine tuning" of the various individual clutches may be performed upon installation of each clutch in each particular machine. Indeed, it is conceivable that many clutches of the same manufactured type may be employed at a plurality of places in an apparatus, or even used in a variety of types of apparatus, the slip torque of each clutch being adjusted as necessary.

U.S. Pat. No. 1,862,267 to Honing discloses an adjustable magnetic slip clutch for use in a wire-winding machine. An inner clutch member attached to one portion of the clutch is axially movable within a cup-shaped second magnetic member, and the slip torque is variable by moving the members relative to each other to vary the amount of surface area between the two members. The two members are disposed in a self-regulator arrangement with a tensioner member which moves according to the tension of wire being wound on a spool attached to the clutch. U.S. Pat. No. 3,974,884 to Gidlund discloses a power wrench with a variable coupling between a driving member and a driven member. A clutch is formed by two intercoupled sleeves which are interlockable in preselected relative angular positions. U.S. Pat. No. 4,239,092 to Janson relates to a magnetic tensioning device comprising a rotatable outer housing and a magnetic assembly positioned in the interior of the outer housing. A space is provided between the outer housing and the magnetic assembly. A plurality of magnetic particles are positioned in the space between the magnetic assembly and the outer housing, held in place by flux from the magnetic assembly. U.S. Pat. No. 4,469,220 to Becker discloses a magnetic coupling assembly for driving a conveyor roll from a power drive. The conveyor roll includes a tube portion having a permanent magnet therein and a field face member secured in opposing relationship to the permanent magnet. The torque capacity of the roller is varied by varying the air gap between the permanent magnet and field face member.

It is an object of the present invention to provide a magnetic clutch with an adjustable slip torque which may be easily incorporated within the structure of a roller for use in a sheet feeding apparatus.

It is another object of the present invention to provide such a magnetic clutch which is simple to manufacture, simple to adjust, and resistant to drift in its selected slip torque.

It is another object of the present invention to provide an anti-misfeeding device for use in a paper-feeding apparatus, as would be used, for example, in an electrophotographic printer.

Other objects will appear hereinafter.

SUMMARY OF THE INVENTION

In accordance with one aspect of the present invention, there is provided a magnetic clutch having an adjustable slip torque. A housing, having an outer surface of a predetermined frictional coefficient, is disposed around a portion of a shaft, and is rotatable relative to the shaft. An outer magnetic member is disposed on the inner surface of the housing, and an inner magnetic member is attached to the shaft and disposed within the housing. The slip torque is adjusted by varying the amount of surface area exposure between the inner magnetic member and the outer magnetic member.

Pursuant to another aspect of the present invention, there is provided an apparatus for preventing misfeeding in a sheet feeder, comprising the above-described magnetic clutch. A feed roll, being rotatable and having an outer surface of a predetermined frictional coefficient, is disposed alongside a clutch roll incorporating the above-described magnetic clutch, forming a nip therebetween for the passage of a sheet therethrough. The frictional coefficients of the feed roll and the housing of the clutch roll and the slip torque of the clutch roll are related to the frictional coefficient of sheets passing through the nip so that a single sheet passing through the nip will be engaged by the feed roll and the housing of the clutch and multiple sheets passing through the nip will slide relative to each other and cause the housing of the clutch roll to rotate relative to the shaft.

Figure 1:
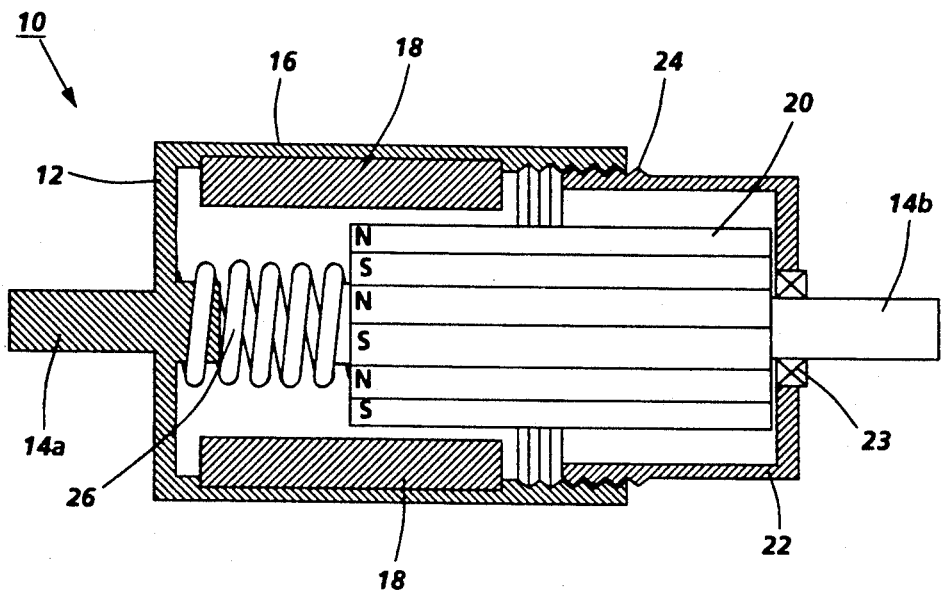
FIG. 1 is a partial cross-sectional view showing the interior of a clutch in the form of a roller, according to the present invention.

In the drawings and the following description, it is to be understood that like numeric designations refer to components of like function. While the present invention will be described in connection with preferred embodiments thereof, it will be understood that it is not intended to limit the invention to those embodiments. On the contrary, it is intended to cover all alternatives, modifications, and equivalents as may be included within the spirit and scope of the invention as defined by the appended claims.

DETAILED DESCRIPTION OF THE INVENTION

Although specific terms are used in the following description for the sake of clarity, these terms are intended to refer only to the particular structure of the invention selected for illustration in the drawings, and are not intended to define or limit the scope of the invention.

FIG. 1 is a partial cross-sectional view showing the interior of a clutch in the form of a roller, according to the present invention. The roller, indicated generally as 10, comprises a cylindrical housing 12 which is rotatable about a shaft shown in two portions, 14a and 14b. The main portion of the outer surface 16 of the housing 12 has associated therewith a specific frictional coefficient, for reasons which will become apparent below. The roller 10 further includes an outer magnet 18, an inner magnet 20, an end cap 22, threaded portion 24, and a coil spring 26.

Outer magnet 18 is disposed inside housing 12 and is rigidly attached to an inner surface thereof. Outer magnet 18 preferably extends through the entire circumference of the housing 12 along a significant portion of the axial length of the housing 12. Because outer magnet 18 is rigidly attached to the housing 12, the outer magnet 18 will rotate with the housing 12.

Outer magnet 18 is "magnetic" in the sense that it will interact with a magnetized member placed near it. Outer magnet 18 may conceivably be made of a ferromagnetic material which is itself unmagnetized, but in the preferred embodiment of the present invention, outer magnet 18 has distinct magnetic properties with discrete areas of ferromagnetic polarity. Such an outer magnet 18 may be conveniently made from a quantity of magnetized plastic, that is, a flexible plastic substance with magnetizable particles embedded uniformly therein. Such a construction facilitates the preferred configuration of poles in outer magnet 18, which is shown in FIG. 2.

Figure 2:
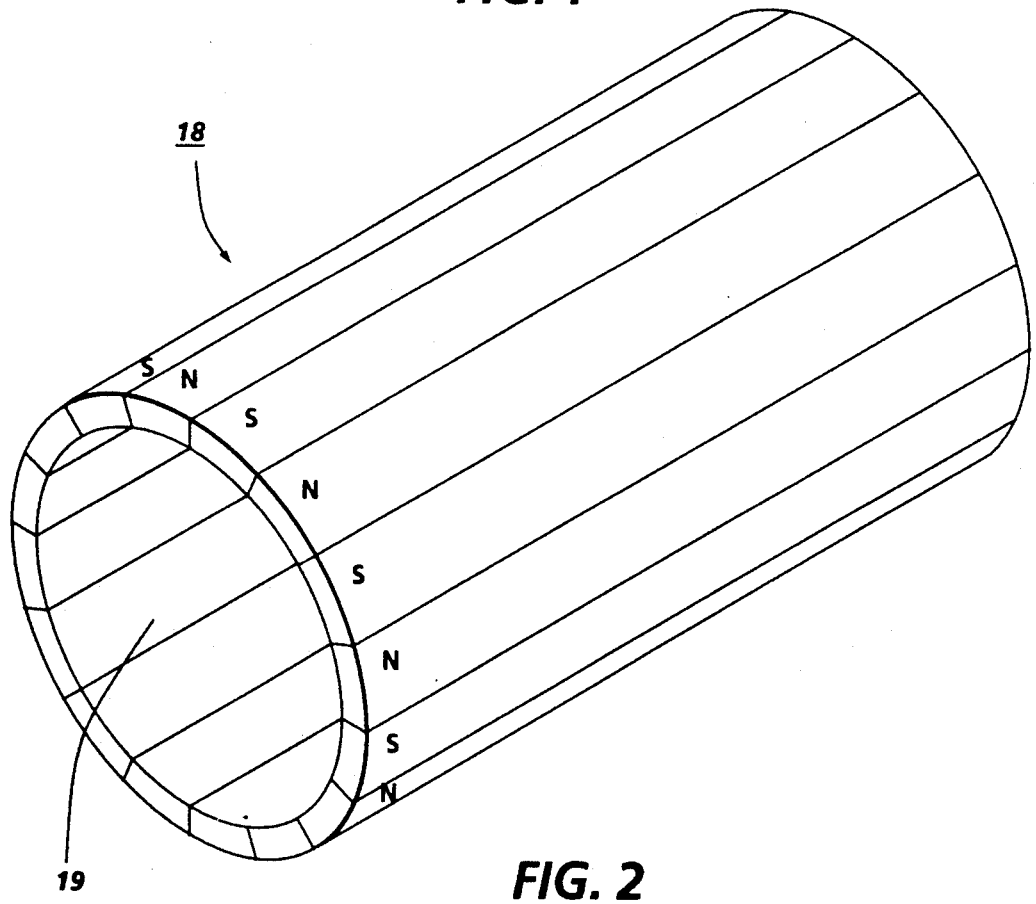
FIG. 2 is an elevational view of an outer magnet used in an embodiment of the present invention, shown in isolation.

FIG. 2 is an elevational view of outer magnet 18 in isolation. In the preferred embodiment of the present invention, outer magnet 18 defines a central cavity 19, having arranged around the circumference thereof a plurality of radially-disposed poles, of alternating polarities, each pole extending in an axial line. Such a configuration of poles allows for advantageous interaction of outer magnet 18 with inner magnet 20, as will be explained below.

Within roller 10, inner magnet 20 may be disposed to a selectable extent within cavity 19 of outer magnet 18. Returning to FIG. 1, inner magnet 20 is shown as disposed coaxially with shaft 14b, with an axial portion of inner magnet 20 inside the cavity 19 formed by outer magnet 18. The main outer surface of inner magnet 20, adjacent to outer magnet 18, is preferably made of a magnetized material similar to that of outer magnet 18. Inner magnet 20 defines, similarly to outer magnet 18, a plurality of radially-disposed magnetic poles, of alternating polarities around its circumference, each pole extending in an axial line, as shown in FIG. 1. Thus, if inner magnet 20 is rotated within outer magnet 18, the motion of the poles of one magnet relative to the poles of the other will set up an alternating pattern of attraction and repulsion along the radii of the magnets as they move relative to each other. This alternating attraction and repulsion results in a significant mechanical resistance when inner magnet 20 is rotated within outer magnet 18. This mechanical resistance, in turn, provides a finite quantity of slip torque to the clutch of roller 10.

The slip torque created by inner magnet 20 and outer magnet 18 is manifested in the roller 10 by mounting the magnets on separate portions of roller 10. As mentioned above, outer magnet 18 is mounted rigidly on an inner surface of housing 12. Shaft portion 14a is mounted rigidly on housing 12 and rotates therewith. In the embodiment of the present invention shown in FIG. 1, inner magnet 20 is mounted at one end of the shaft portion 14b. Thus, housing 12 (with shaft portion 14a) and shaft portion 14b form the two portions of the clutch which may move relative to each other depending on the torque applied to the housing 12, as compared to the slip torque created by the relationship between outer magnet 18 and inner magnet 20.

Inner magnet 20, which is rigidly attached to shaft portion 14b, is rotatably mounted within a end cap 22. End cap 22 is generally in the form of a short cylinder threadably mounted at one end of the housing 12. End cap 22 includes a central opening with a bearing 23 disposed around the circumference thereof. Bearing 23 may be made of plastic or other low-friction material, and serves to hold inner magnet 20 generally centered within the cavity of outer magnet 18. End cap 22 is attached to housing 12 by a threaded section 24. Threaded section 24 forms a reasonably tight fit relative to housing 20, so that housing 12 and threaded section 24 will not move relative to each other in the normal course of use of roller 10. Bearing 23 allows shaft portion 14b to rotate freely relative to the end cap 22, which, in the embodiment shown, remains fixed relative to housing 12 once it is adjusted. Such a relative rotation of threaded section 24 will cause an axial movement of inner magnet 20 relative to outer magnet 18; and this relative axial motion of the magnets facilitates adjustment of the slip torque between housing 12 and shaft portion 14b.

The slip torque of the clutch of roller 10, which is the slip torque between inner magnet 20 and outer magnet 18, and thus between housing 12 and shaft portion 14b, is a function of the relative common surface area between inner magnet 20 and outer magnet 18. The total magnetic flux passing between inner magnet 20 and outer magnet 18 is a function of the amount of effective surface area the two magnets have in common. Assuming that the gap between the outward-facing surface of inner magnet 20 and the inner-facing surface of outer magnet 18 is relatively small, the amount of magnetic flux passing between the magnets will vary linearly with the axial position of the inner magnet 20, or more specifically, with the amount of axial length of inner magnet 20 disposed within outer magnet 18. The greater this axial length, the greater the amount of flux will pass between the magnets, and the greater the slip torque that will be provided between shaft portion 14b and housing 12. This amount of common axial length, and thus the slip torque of the clutch of roller 10, is adjusted by screwing or unscrewing end cap 22 by threaded section 24 relative to housing 12.

In order to minimize drift of a selected relative position of inner magnet 20 and outer magnet 18 over the course of use, the embodiment of the present invention shown in FIG. 1 includes a coil spring 26 disposed within housing 12, between the end of inner magnet 20 and an inner surface of housing 12 adjacent shaft portion 14a. The coil spring 26 urges inner magnet 20 axially away from outer magnet 18, but the threading in threaded section 24 restricts axial movement of inner magnet 20. Thus, the coil spring 26 maintains inner magnet 20 securely in its preselected axial position relative to outer magnet 18, and thus maintains the slip torque of the clutch of roller 10 at its preselected level. In the embodiment shown in FIG. 1, wherein the housing 12 is rigidly attached to shaft portion 14a, coil spring 26 is rigidly attached to the inside of housing 12 and may rotate with housing 12 against the end of inner magnet 20. Variations on this specific design, maintaining the general principle of the invention as defined in the claims, will be evident to those skilled in the art.

In sum, the clutch of the present invention embodied in roller 10 functions as follows. In operation, roller 10 is rotatably mounted by shaft portions 14a and 14b. When an external torque is applied to the outer surface 16 of housing 12, and the applied torque is less than the slip torque of the roller 10, housing 12 and shaft portion 14a will rotate with shaft portion 14b; in such a case, the magnetic attraction between outer magnet 18 and inner magnet 20 will be sufficient to insure that outer magnet 18 and inner magnet 20 move together, and thus cause housing 20 and shaft portion 14a (upon which outer magnet 18 is mounted) to move with shaft portion 14b (upon which inner magnet 20 is mounted). However, if the applied torque on housing 12 is increased to exceed the slip torque of the roller 10, there will be relative movement between outer magnet 18 and inner magnet 20, because the force of the magnetic attraction therebetween will be exceeded by the force of the external torque. The resulting relative motion between the magnets will cause a disengagement of the clutch, which means that shaft portion 14b will be able to move independently of housing 12 and shaft portion 14a. The exact value of the slip torque associated with the roller 10 is related to the amount of axial length of inner magnet 20 within outer magnet 18, which may be adjusted by adjusting the position of end cap 22 around threaded portion 24.

The clutch in the form of roller 10 provides many advantages over prior art magnetic clutches. The linear relationship between the axial position of inner magnet 20 and the slip torque allows for precisely-controlled adjustment of the slip torque. Such an arrangement stands in contrast to adjustable magnetic clutches wherein the slip torque is variable with the length of a gap between magnetic members; in such cases the slip torque varies with the relative positions of the magnetic members in a less precise inverse-square relationship. No arrangement including magnetic particles is necessary, as with prior art clutches. The magnets are of a shape which may be easily adapted from commercially available plastic magnets, which are commonly manufactured in the form of a flexible sheet; outer magnet 18, for example, may be made simply by wrapping such a sheet around the interior of housing 12. The manufacturing tolerances of the roller are very favorable; for instance, inner magnet 20 need not be perfectly concentric with outer magnet 18, as any variation in slip torque caused by non-concentric placement may be compensated for by adjustment of the axial position of inner magnet 20 at installation. The roller 10 of the embodiment of FIG. 1 clearly carries out its objects with much fewer parts than comparable clutches in the prior art.

Although the above-described clutch embodied in roller 10 may be employed in any situation where such a clutch is suitable, roller 10 is particularly useful in the context of an anti-misfeeding device as would be used, for example, in the sheet-feeding portion of an electrophotographic printer. Such a sheet-feeding device may be a copy sheet feeder, a feeder for originals to be copied, or an automatic document handler, such as a recirculating document handler. In any case, the roller 10 is used in conjunction with a feed roll. The feed roll operates alongside the roller 10, and a nip for the passage of a sheet therethrough is formed therebetween. The purpose of such a device is to ensure that only one sheet at a time passes through the nip; if multiple sheets are introduced through the nip, the action of roller 10 will cause the sheets to slide against each other so that superfluous sheets will not pass through the nip.

Figure 3A:
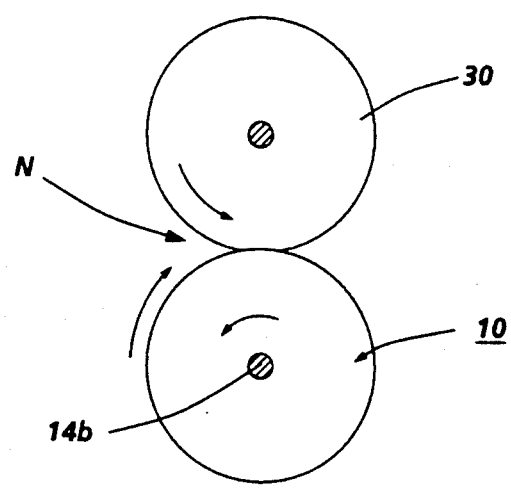
FIGS. 3A, 3B, and 3C are simplified views showing the operation of an anti-misfeeding device incorporating the present invention.
Figure 3B:
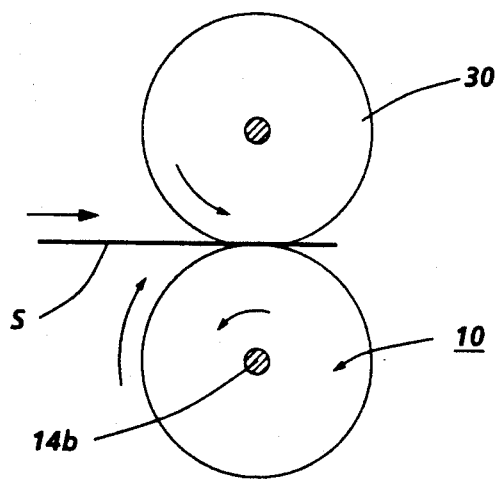
Figure 3C:
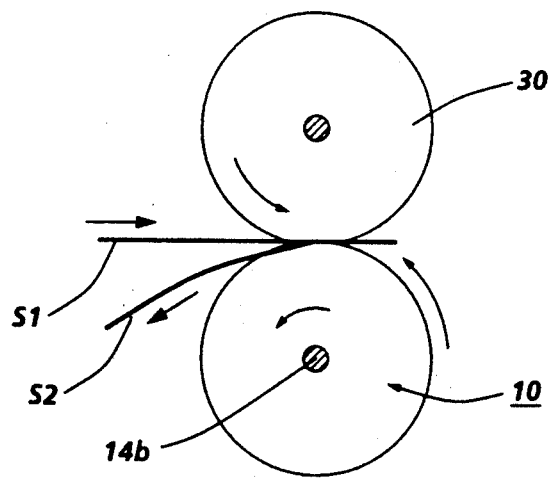

FIGS. 3A, 3B, and 3C illustrate the operation of an anti-misfeeding device incorporating a roller 10 as described above, in conjunction with a feed roll indicated as 30. In the Figures is shown roller 10 end-on, with the relative motions of shaft portion 14b and housing 12 indicated by arrows, interacting with feed roll 30. FIG. 3A shows the device before any sheets are introduced into the nip N. In this idling mode, feed roll 30 (which is, effectively, a solid member) is rotated (by a drive means, not shown) in a direction whereby a sheet engaged by the feed roll 30 would pass through the nip. Feed roll 30 also applies a torque to housing 12 of roller 10, similarly in the direction of motion of a sheet passing through the nip. At the same time, however, shaft portion 14b is driven in a direction opposite that of housing 12 by another drive means (not shown) associated therewith. The torque provided by the feed roll 30, added to the oppositely-directed torque of shaft portion 14b, is thus greater than the slip torque of roller 10, thus allowing the clutch in roller 10 to slip so that housing 12 and shaft portion 14b in roller 10 can move relative to each other. This combination of torques may be provided by an appropriate amount of normal force between feed roll 30 and roller 10; as mentioned above, the outer surface 16 of housing 12 must have a sufficient frictional coefficient to "accept" the torque applied by feed roll 30 without undue slippage.

FIG. 3B shows the device when a single sheet S is introduced into the nip N. If the single sheet is fed into the nip correctly, the sheet will be engaged by both feed roll 30 and roller 10, and be moved through the nip by the motion of both. The frictional coefficients of both the feed roll 30 and the outer surface 16 of housing 12 should be sufficient to move the sheet S through the nip N by frictionally engaging both surfaces of the sheet S. Such an engagement will maintain the application of torque from the feed roll 30 to the housing 12 of roller 10, so that, as in the idling mode, housing 12 and shaft portion 14b in roller 10 will move relative to each other and shaft portion 14b will continue rotating in the opposite direction. It should be noted that, in most sheet-feeding contexts, the normal force between feed roll 30 and the housing 12 sufficient to apply enough torque to exceed the slip torque of roller 10 can be provided only when there is a single sheet S in the nip. If more than one sheet is introduced in the nip, there will not be enough normal force, and the clutch of roller 10 will slip, as will be explained below.

FIG. 3C shows the device in a typical multifeeding situation, that is, when more than one sheet (for example, off a stack of sheets) is introduced in the nip. It is common, when feeding bond paper sheets for example, to have a relatively low frictional coefficient among sheets of the same type, compared to the frictional coefficient between one sheet and the outer surface of either the feed roll 30 or the outer surface 16 of housing 12. Thus, when multiple sheets, such as S1 and S2 shown, are introduced in the nip, the sheets will slide against each other, and thus reduce significantly the relative frictional coefficient between feed roll 30 and the outer surface 16 of housing 12. This reduction in friction will significantly reduce the amount of torque from feed roll 30 which is available to rotate housing 12 so that it will move in the opposite direction from shaft portion 14b. As shown in FIG. 3C, this drop in friction across the nip causes the clutch in roller 10 to engage, so that housing 12 will be driven by shaft portion 14b. When the clutch is so engaged, housing 12 rotates in a direction against the motion of sheets through the nip. With this opposite turning of housing 12, any number of superfluous sheets, such as S2, will be pushed backward, out of the nip. Only when there is exactly one sheet in the nip will there be enough friction across the nip to disengage the clutch and drive housing 12 in a direction opposite that of shaft portion 14b. In this way, the adjustable magnetic clutch in roller 10 avoids multifeeding.

In order for such a device to work properly, the frictional coefficients of feed roll 30 and the outer surface 16 of housing 12, as well as those of the sheets being fed, must be coordinated with the slip torque of the roller 10. The adjustable clutch of the present invention is perfectly suited for the fine tuning necessary to allow a system to operate at optimum efficiency for a given type of sheet.

Figure 4:
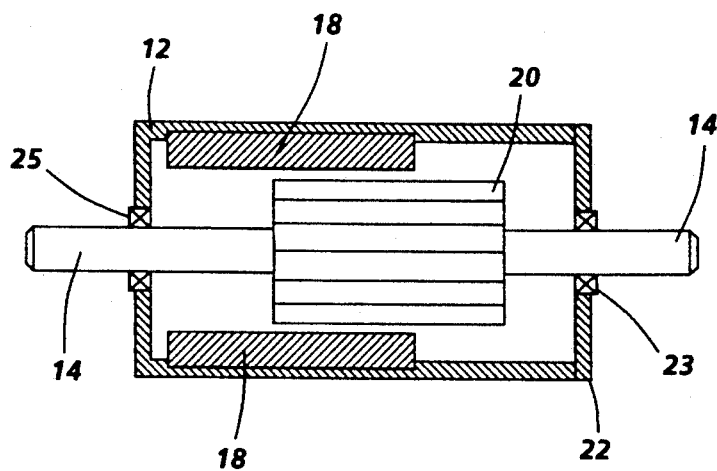
FIGS. 4 and 5 are partial cross-sectional views showing alternate embodiments of the present invention.
Figure 5:
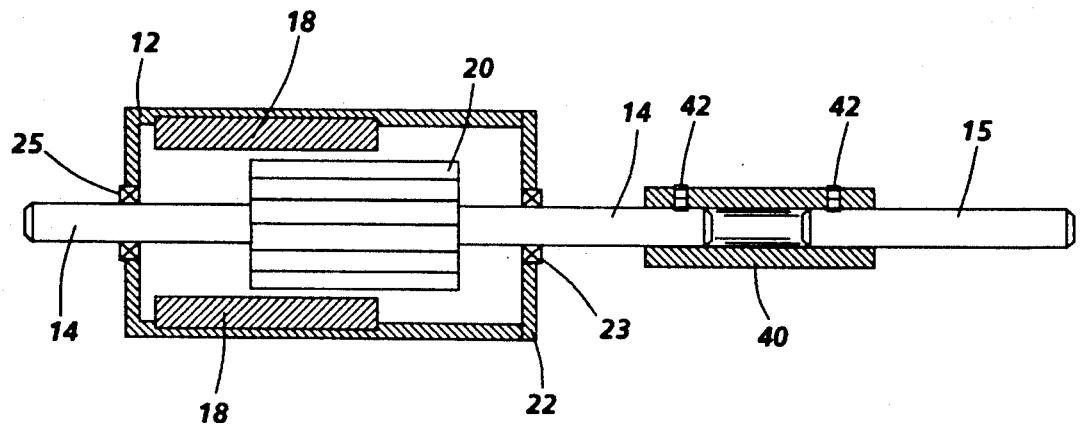
Figure 6:
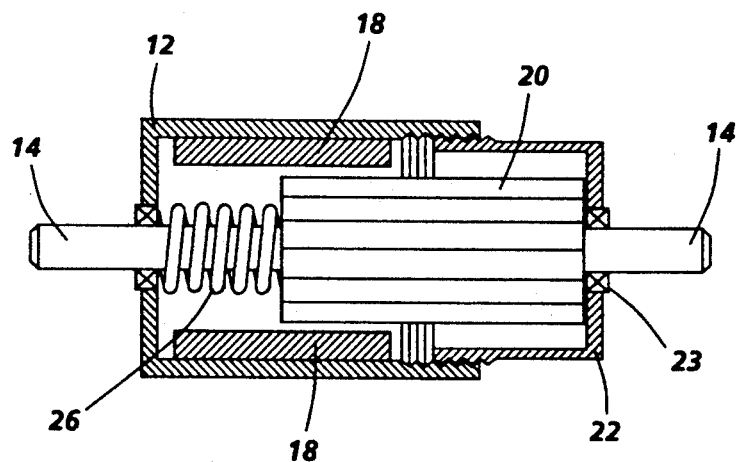

The embodiment of the invention shown in FIG. 1 is a clutch in the form of a roller providing a desired slip torque between the housing 12 and shaft portion 14b. In that embodiment, shaft portion 14a is rigidly attached to and rotates with the housing 12. Such a design may be conducive to a clutch in the form of a roller using a small number of inexpensive parts. However, variations on the basic design of the roller 10 of FIG. 1 may be made within the scope of the appended claims. FIGS. 4, 5, and 6 show different variations on the basic design.

In the roller shown in FIG. 4, the clutch provides a desired slip torque between the housing 12 and both ends of a single shaft 14. In other words, whereas the roller 10 in FIG. 1 effectively provides a slip torque between shaft portions 14a and 14b, the roller of FIG. 4 provides a slip torque between the housing 12 alone and a single, two-ended shaft 14. Such a roller would be useful, for example, if the shaft 14 of the roller is desired to be rigidly (as opposed to rotatably) mounted in an apparatus. In the roller of FIG. 4, the inner magnet 20 is rigidly mounted on a portion of a single shaft 14. The inner magnet 20 is disposed within the housing 12 and partially within outer magnet 18. At either end of the housing 12 are bearings 23 and 25. Bearings 23, 25 allow the housing 12 to rotate relative to shaft 14, with a slip torque depending, as above, on the position of inner magnet 20 relative to outer magnet 18. In order to adjust the axial position of inner magnet 20 within outer magnet 18 and thereby adjust the slip torque, the entire outer housing 12 is moved axially relative to shaft 14. Such a design incorporates even fewer parts than the design of FIG. 1, but includes the disadvantage of possible unintentional movement of the housing 12 relative to the shaft 14. Also, the axial movement of housing 12 to adjust the slip torque may not be accommodated by the design of apparatus in which the roller is placed. The bearings 23, 25 may be designed to limit the amount of unintended axial drift of the housing 12 relative to the shaft 14.

FIG. 5 shows a roller similar to that shown in FIG. 4 in conjunction with a coupling 40, which allows relative movement between the shaft 14 and the housing 12, while retaining either a constant effective length of shaft 14 or a constant axial position of housing 12. The coupling 40 is simply a tubular member which allows axial adjustment of one end of shaft 14 within the coupling so as to allow for axial adjustment of the inner magnet 20 within housing 12. The coupling 40 may include one or more set screws 42 to maintain the shaft 14 and the inner magnet 20 at the desired axial position. The coupling 40, in effect, compensates for the change in position of the shaft 14 when it is moved relative to the housing 12. As shown in FIG. 5, a coupling 40 may include an additional shaft 15, which may be mounted in an apparatus as though it were just a continuation of the shaft 14. Shaft 15 may also be moved axially within the coupling 40. By adjusting the relative positions of shafts 14 and 15 within the coupling 40, an operator may adjust the relative position of inner magnet 20 relative to housing 12 while maintaining the desired axial position of housing 12 within the apparatus, or maintaining the desired total length of shafts 14 and 15.

FIG. 6 shows another embodiment of the present invention, combining the basic features of the roller 10 in FIG. 1 with a solid shaft 14, as opposed to the shaft portions 14a and 14b in FIG. 1. The roller of FIG. 6 is similar in most respects to the roller 10 in FIG. 1, with the addition of bearing 25, which allows a single shaft 14 to rotate relative to housing 12. Whereas in the roller 10 of FIG. 1, the coil spring 26 was rigidly mounted within the housing 12, the coil spring 26 in the roller of FIG. 6 is wrapped around the shaft 14, which is rotatable within it. Coil spring 26 urges the inner magnet 20 (and the shaft 14 as well) against end cap 22. End cap 22 is provided to adjust the relative position of inner magnet 20 within outer magnet 18, as in the other embodiments. Once again, the advantage of this design is that the entire shaft 14 may be rigidly mounted within an apparatus, and the desired slip torque is provided between the shaft 14 and housing 12.

While this invention has been described in conjunction with a specific embodiment thereof, it is evident that many alternatives, modifications, and variations will be apparent to those skilled in the art. Accordingly, it is intended to embrace all such alternatives, modifications and variations that fall within the spirit and broad scope of the appended claims.

What is claimed is:

1. A magnetic clutch providing an adjustable slip torque, comprising:
   a shaft;
   a housing disposed around at least a portion of the shaft, rotatable relative to the shaft, having an outer surface of a predetermined frictional coefficient, and an inner surface;
   at least one outer magnetic member, disposed on the inner surface of the housing;
   at least one inner magnetic member attached to the shaft, and disposed within the housing, defining a plurality of outwardly-facing discrete areas of ferromagnetic polarity arranged radially relative to the shaft; and
   means for varying the amount of surface area exposure between the inner magnetic member and the outer magnetic member, thereby facilitating adjustment of the slip torque between the shaft and the housing, including means for moving the inner magnetic member axially relative to the outer magnetic member.

2. A magnetic clutch as in claim 1, wherein the outer magnetic member defines a plurality of inwardly-facing discrete areas of ferromagnetic polarity arranged radially relative to the shaft.

3. A magnetic clutch as in claim 1, wherein the outer magnetic member defines a central cavity having on an inner surface thereof a plurality of inwardly-facing discrete areas of ferromagnetic polarity arranged radially relative to the shaft, and the inner magnetic member defines a plurality of outwardly-facing discrete areas of ferromagnetic polarity arranged radially relative to the shaft.

4. A magnetic clutch as in claim 3, wherein the housing is axially movable relative to the shaft.

5. A magnetic clutch as in claim 4, further including an external coupling disposed at one end of the shaft external to the housing, the coupling being adapted for maintaining the end of the shaft at a preselected axial position therewithin.

6. A magnetic clutch as in claim 3, further comprising:
   at least one end cap, the end cap being threadably mounted at one axial end of the housing for adjustment of the axial position of the end cap relative to the housing, the end cap defining a opening therein; and
   a bearing disposed around the opening and around a portion of the shaft, the bearing being adapted to permit rotation of the shaft relative to the housing;
   whereby axial adjustment of the end cap causes axial adjustment of the position of the inner magnetic member within the outer magnetic member.

7. A magnetic clutch as in claim 6, further comprising a coil spring disposed within the housing, adapted to urge the housing axially away from the inner magnetic member.

8. A magnetic clutch as in claim 6, including a second opening defined in the end of the housing opposite that of the end cap, the second opening having a second bearing disposed therein, the second bearing permitting axial and rotational relative motion between the shaft and the housing.

9. An apparatus for advancing sheets, comprising:
   a rotatable feed roll, having an outer surface of a predetermined frictional coefficient; and
   a clutch roll, disposed adjacent to the feed roll and forming a nip therewith for receiving sheets, the clutch roll providing an adjustable slip torque and including
   (a) a rotatable shaft,
   (b) a housing disposed around a portion of the shaft, rotatable relative to the shaft, having an outer surface of a predetermined frictional coefficient, and an inner surface,
   (c) at least one outer magnetic member, disposed on the inner surface of the housing,
   (d) at least one inner magnetic member, attached to the shaft and disposed within the housing, and
   (e) means for varying the amount of surface area exposure between the outer surface of the inner magnet and the outer magnet, thereby varying the slip torque of the housing relative to the shaft;
   whereby the frictional coefficients of the feed roll and the housing of the clutch roll and the slip torque of the clutch roll are related to the frictional coefficient of sheets passing through the nip so that a single sheet passing through the nip will be engaged by the feed roll and the housing of the clutch and multiple sheets passing through the nip will slide relative to each other and cause the housing of the clutch roll to rotate relative to the shaft.

10. An apparatus as in claim 9, wherein at least one of the outer magnetic member and the inner magnetic member of the clutch roll is a permanent magnet.

11. An apparatus as in claim 9, wherein the feed roll drives the clutch roll in a direction consistent with motion of a sheet through the nip.

12. An apparatus as in claim 9, wherein the means in the clutch roll for varying the amount of surface area exposure between the inner magnetic member and the outer magnetic member includes means for moving the inner magnetic member axially relative to the outer magnetic member.

13. An apparatus for advancing sheets, comprising:
   a rotatable feed roll, having an outer surface of a predetermined frictional coefficient; and
   a clutch roll, disposed adjacent to the feed roll and forming a nip therewith for receiving sheets, the clutch roll providing an adjustable slip torque and including:
   (a) a rotatable shaft,
   (b) a housing disposed around a portion of the shaft, rotatable relative to the shaft, having an outer surface of a predetermined frictional coefficient, and an inner surface,
   (c) at least one outer magnetic member, disposed on the inner surface of the housing defining a central cavity having on an inner surface thereof a plurality of inwardly-facing discrete areas of ferromagnetic polarity arranged radially relative to the shaft, (d) at least one inner magnetic member, attached to the shaft and disposed within the housing, wherein the inner magnetic member defines a plurality of outwardly-facing discrete areas of ferromagnetic polarity arranged radially relative to the shaft, and (e) means for varying the amount of surface area exposure between the outer surface of the inner magnet and the outer magnet, thereby varying the slip torque of the housing relative to the shaft;

whereby the frictional coefficients of the feed roll and the housing of the clutch roll and the slip torque of the clutch roll are related to the frictional coefficient of sheets passing through the nip so that a single sheet passing through the nip will be engaged by the feed roll and the housing of the clutch and multiple sheets passing through the nip will slide relative to each other and cause the housing of the clutch roll to rotate relative to the shaft.

14. An apparatus for advancing sheets, comprising:

a rotatable feed roll, having an outer surface of a predetermined frictional coefficient; and a clutch roll, disposed adjacent to the feed roll and forming a nip therewith for receiving sheets, the clutch roll providing an adjustable slip torque and including:

(a) a rotatable shaft, (b) a housing disposed around a portion of the shaft, rotatable relative to the shaft, having an outer surface of a predetermined frictional coefficient, and an inner surface, (c) at least one outer magnetic member, disposed on the inner surface of the housing, (d) at least one inner magnetic member, attached to the shaft and disposed within the housing, and (e) means for varying the amount of surface area exposure between the outer surface of the inner magnet and the outer magnet, thereby varying the slip torque of the housing relative to the shaft, (f) at least one end cap, the end cap being threadably mounted at one axial end of the housing for adjustment of the axial position of the end cap relative to the housing, the end cap defining an opening therein, and (g) a bearing disposed around the opening and around a portion of the shaft, the bearing being adapted to permit rotation of the shaft relative to the housing. whereby axial adjustment of the end cap causes axial adjustment of the position of the inner magnetic member within the outer magnetic member;

whereby the frictional coefficients of the feed roll and the housing of the clutch roll and the slip torque of the clutch roll are related to the frictional coefficient of sheets passing through the nip so that a single sheet passing through the nip will be engaged by the feed roll and the housing of the clutch and multiple sheets passing through the nip will slide relative to each other and cause the housing of the clutch roll to rotate relative to the shaft.

* * * * *